United States Patent [19]
Lawler

[11] 3,803,927
[45] Apr. 16, 1974

[54] COAXIAL FORCE AND MOVEMENT MECHANISM FOR A MACHINE TOOL

[75] Inventor: Martin David Lawler, Harleysville, Pa.

[73] Assignee: Bridgeport Machines, Inc., Bridgeport, Conn.

[22] Filed: July 10, 1972

[21] Appl. No.: 269,977

[52] U.S. Cl............. 74/89.15, 408/135, 74/424.8 B
[51] Int. Cl............................................. F16h 27/02
[58] Field of Search.................... 408/135, 134, 130; 74/89.15, 424.8 B

[56] References Cited
UNITED STATES PATENTS

| | | | |
|---|---|---|---|
| 3,512,421 | 5/1970 | Anderson | 74/89.15 |
| 2,977,814 | 4/1961 | Brunson, Jr. | 74/424.8 B |
| 2,590,745 | 3/1952 | Wuensch | 74/424.8 E |
| 2,918,720 | 12/1959 | Delamater | 408/130 |
| 3,342,087 | 9/1967 | Mulot | 408/130 |
| 3,254,543 | 6/1966 | Donath | 408/135 |
| 3,389,413 | 6/1968 | Van Den Kieboom | 408/130 |

Primary Examiner—Samuel Scott
Assistant Examiner—Wesley S. Ratliff, Jr.
Attorney, Agent, or Firm—Dorfman, Herrell and Skillman

[57] ABSTRACT

In a conventional machine tool wherein a spindle is mounted within and rotatable relative to a quill, which in turn is supported on a housing frame for relative axial movement, a nut is provided coaxially surrounding the quill and having helical threaded engagement therewith. Driving actuator means supported on the frame operates on the nut and quill combination to rotatably move one member of the combination relative to the other to produce linear axial movement of the quill and spindle relative to the frame.

12 Claims, 4 Drawing Figures

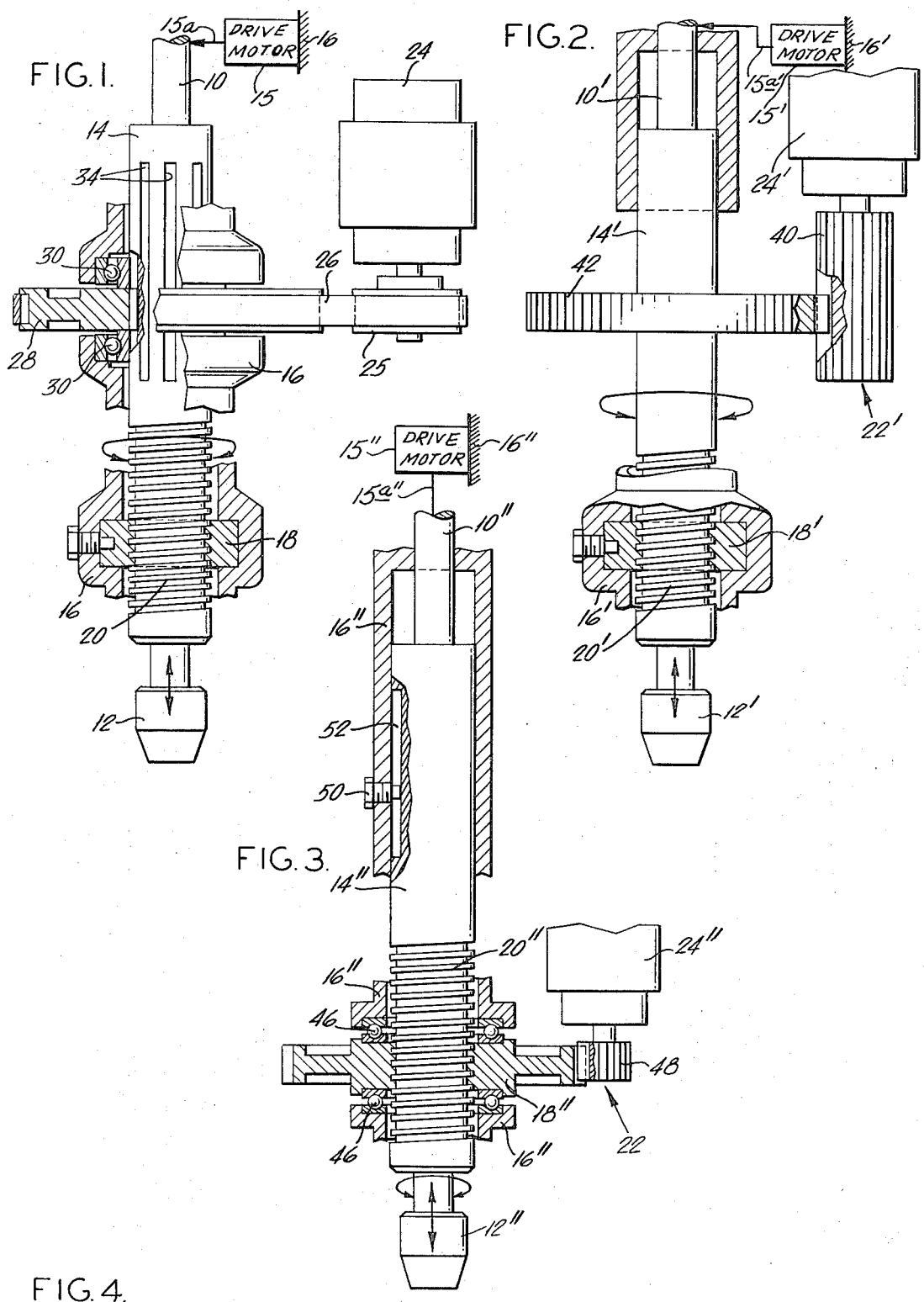

COAXIAL FORCE AND MOVEMENT MECHANISM FOR A MACHINE TOOL

The present invention relates to an improvement in machine tools which employ a tubular quill within which is located a relatively rotatable spindle defining an axis of rotation with appropriate bearings therebetween and having a reference frame supporting the quill. The present invention makes possible a much simpler and less expensive means of movement of the quill and the spindle in the axial direction when controlled by a driving motor or actuator.

In the prior art axial movement of a quill in a machine tool has been accomplished by relatively expensive and complicated control means. There are in general three means of moving the quill. The first of these control means uses an off-center rack and pinion on the outside wall of the quill to produce axial movement. This means has the disadvantage of producing undesirable sied loading of the quill relative to its housing which may, if exaggerated, produce errors in work. The error is uneven depending upon the amount of reaction force acting on the quill through the spindle. This effect is sometimes known in the trade by the term "quill kick."

The second means relatively commonly used for quill movement to avoid the "quill kick" effect is axial loading applied to the spindle or the quill from a conventional actuator or lead screw. This ordinarily has the effect of extending the spindle, or the whole structure of the machine, to undesirable heights, making it awkward to handle and install. It also basically constitutes an expensive means of accomplishing the result, often out of proportion to the cost involved in other mechanisms within the machine tool.

A further means of accomplishing the quill movement is to use an arm extending radially outwardly from the quill connected to a lead screw or other actuator, which drives the quill through the arm. However, this system, like the first tends to produce quill kick.

The present invention is directed to a mechanism which is simple and relatively inexpensive in its various forms and which provides axial quill movement by forces applied coaxially to the quill structure so that quill kick is avoided. It is also capable of application within the normal housing frame of the typical machine tool so that it requires neither excessive height, extension to the tool, nor elaborate and expensive means of avoiding the additional height.

More specifically, in a machine tool of the type described the improvement consists of providing a nut coaxially surrounding the quill and having helical threaded engagement therewith and driving actuator means supported on the frame and operating on the nut and quill combination to rotatably move one member of the combination relative to the other to produce linear axial movement of the quill and spindle relative to the frame. This is done in such a manner that the driving actuator means imposes thrust upon the quill to drive the spindle relative to the frame whereby movement of the tool on the spindle into a work piece for cutting purposes will impose axial thrust forces of reaction on the reference frame through the quill and the nut.

For a better understanding of the present invention reference is made to the drawing in which FIG. 1 shows one version of the present invention, in vertical sectional view and in a somewhat schematic form a portion of a machine tool with the improvement in accordance with the present invention;

FIG. 2 is a schematic drawing similar to FIG. 1, showing a modified form of the present invention;

FIG. 3 is a schematic view similar to FIGS. 1 and 2 showing still another modification of the present invention; and FIG. 4 is a schematic view showing an alternative drive arrangement for the machine of FIG. 3.

Referring to FIG. 1, it will be appreciated that what is represented by the somewhat schematic drawing is only a portion of a machine tool. Only portions of the machine tool to which the invention are applicable are illustrated and, therefore, neither the drive nor the coupling for the tool is illustrated. It will be appreciated that these parts may be of any conventional and well-known type, and therefore it will suffice to illustrate schematically the spindle drive and coupling. The machine tool in this example might be, for example, a drill press or a vertical milling machine, although the invention has application to horizontally oriented machine tools or machine tools having any other attitude, for that matter.

The machine tool is primarily a rotational device, of which the spindle 10 is the connection between the main drive and a tool 12 schematically illustrated. The spindle 10 is located preferably coaxially within a tubular quill 14, which in many respects is a conventional type of quill and is provided with appropriate bearings to separate the spindle from the quill and permit relative rotation between the spindle and the quill. The structure in general is supported relative to a machine frame 16, which commonly is a housing enclosing the entire quill 14, or at least substantial portions of the quill. Ordinarily, a drive motor (here shown schematically as block 15) for the spindle 10 will be supported on the frame 16 and suitable coupling 15a of conventional type, and here represented schematically as an arrow, will connect the drive means to the spindle to keep the spindle rotating at all times during the working period of the machine tool.

In accordance with the invention, a nut member 18 is provided to coaxially surround the quill 14 and is provided with a helical threaded engagement with the quill. The helical threads 20 on the quill 14 are shown schematically in this embodiment and it will be understood that wherever helical threaded engagement is required in accordance with the present invention the widest possible interpretation of the term is intended. That is, the helical engagement may be a normal thread engagement directly between the nut and the quill in this particular instance, or it may be an engagement involving some other type of thread mechanism, such as a ball lead, or roller bearing lead, or can be any other type of helically threaded device. It is also true that the thread involved may be of various types and shapes, the geometry being immaterial. Furthermore, the pitch of the thread is a matter of choice and not material to the present invention. In fact, in certain applications it is conceivable that various thread forms may be substituted, including possibly devices of non-uniform pitch.

In the embodiment of FIG. 1, the nut 18 is held by the housing 16 in a manner to prevent its axial movement and also to restrain its rotational movement. Since the nut 18 is fixed relative to the frame 16, the quill 14 must be rotational as well as axially movable, and in order to accomplish the rotation, a driving actuator means, generally designated 22, is employed. In this case, the driving actuator means 22 consists of a conventional motor 24, having a rotating shaft, which motor is supported on the housing frame 16 and whose shaft drives a timing gear pulley 25 engaging timing belt 26. Timing belt 26, in turn, engages timing belt pulley 28 coaxially located on the outer periphery of the quill 14. Also, the timing belt pulley 28 is held axially with respect to the frame by suitable thrust bearing means 30 on the frame, which bearings keep the timing belt 26 in the same axial position with respect to the housing frame at all times. The quill itself is able to move vertically by virtue of an axially elongated spline 34 on the quill mating with a splined opening in the timing belt pulley 28 and sufficiently long axially to engage the quill through the full range of its axial movement. This spline connection permits the timing belt 26 through the pulley 28 to continue to drive the quill 14 rotationally through the spline interconnection 34.

FIG. 2 shows another modification of the structure shown in FIG. 1 in which the structure is very much the same throughout much of the construction and similar parts are designated by similar number designators with the addition of primes thereto. As in FIG. 1, the nut 18', having helical threaded engagement with the quill 14' through threads 20' is fixed relative to the housing frame 16'. However, in this particular embodiment, instead of a timing belt, a direct gear interconnection is provided by the driving actuator means 22'. In this particular instance the interconnection between the motor 24' and the quill 14' providing rotation of the quill to cause vertical movement up and down by virtue of coaction with the fixed nut 18', is gear means 40 and 42. Gear 40 is fixed to the shaft of motor 24' and consists of an axially elongated pinion coaxially mounted on the motor shaft, which is parallel to the spindle, or axis of rotation of the quill. The gear 42 fixed to the quill 14 is positively engaged at all times by the pinion 40, but as rotation occurs moving the quill up and down axially relative to the pinion 40, it engages different portions of the pinion 40 which in this way provides a spline function, as well as the gear function. It will be clear to those skilled in the art that gear 42 might be axially elongated and gear 40 may be a more conventional narrower gear, or for that matter, both gears might be axially elongated, if desired.

In passing it might be noted that gears, pulleys, or other portions of the drive mechanism may be made as separate pieces and mechanically attached to the quill, or may be formed integrally with the quill surface. The same thing is true of splines and threads.

Referring next to FIG. 3, the structure shown is again similar to that shown in FIGS. 1 and 2 with some relatively minor modifications. Similar parts are again designated with the same number designators, in this case with the addition of double primes. In this embodiment the nut 18" is again fixed so that it cannot move axially, but it is free to move rotationally. Movement of nut 18" relative to the frame 16" is prevented by bearings 46. The outer periphery of nut 18" may be a gear, which, in turn, engages gear 48 on the shaft of motor 24" forming a portion of the driving actuator means 22". In this case, of course, the nut 18" serves the dual function of providing the means through thread 20" of moving the quill 14" axially and acting as part of the drive actuator means.

In this particular embodiment the quill 14" does not rotate, since the relative rotation between nut and quill is accomplished by rotation of the nut 18". In order to prevent rotation of the quill 14" a pin 50 fixed to the housing frame and engaging an axial groove 52 in the quill prevents rotation of the quill 14", but permits movement of the quill along its axis. It will be apparent to those skilled in the art that in addition to the key and groove structure shown, a spline interfit between the quill 14" and the housing 16" may be substituted. Alternatively a mating and interengaging portion of the frame and the quill of such shape that it will not permit rotation of the quill relative to the frame, but will permit relative axial motion therebetween, may be employed for the same purpose. It is also possible to provide a slide attached to the quill parallel to the axis of rotation, but off of the axis of rotation, which slide in turn, passes through a slide bearing on the frame to accomplish the same purpose.

Although the above embodiments show drive actuation means including timing belts and pulleys as well as gears, it will be clear to those skilled in the art that any other conventional mechanical drive means may be substituted, such as, for example, a chain or cable system. It will also be observed by those skilled in the art, that in addition to electrical motors, the driving actuator means may include other types of motor, or actuator means, such as hydraulic motors, rotary solenoids, and the like. Furthermore, the actuator means may be of a linear type, such as that shown in FIG. 4, with suitable translation means.

Referring to FIG. 4, the linear actuator shown is a fluid operated cylinder of any conventional type in which the cylinder 52 contains a piston 54 with suitable supplies and valving to control movement of the piston 54 within the cylinder 52. A suitable shaft connection means 56 may extend through the cylinder and enable connection at opposite ends to a linear flexible member 58, such as a chain, a belt, a spring, a cable, or any other appropriate device which is fed around pulley 60 and around the pulley formed periphery 62 of the nut 18", for example, in the embodiment of FIG. 3. Pulley 60 has its axis parallel to the spindle axis 10", so that linear actuation of the piston 54 will cause the flexible drive means 58 to drive the nut 18" rotationally through its pulley periphery 62.

A number of embodiments of the present invention have been described. Various modifications shown and described herein have been specifically claimed. Many other embodiments within the scope of the claims will occur to those skilled in the art. All such embodiments within the scope of the claims are intended to be within the scope and spirit of the present invention.

I claim:

1. In a machine tool having a tubular quill within which is located a relatively rotatable spindle defining an axis of rotation with appropriate bearings therebetween and having a reference frame supporting the quill and drive means for rotatably driving the spindle and coupling means connecting the drive means and the spindle, the improvement comprising
providing a nut coaxially surrounding the quill and having helical threaded engagement therewith, and
driving actuator means supported on the frame and operating on the nut and quill combination to rotatably move one member of the combination relative to the other to produce linear axial movement of the quill and spindle relative to the frame such that the driving actuator means imposes axial thrust upon the quill to drive the spindle relative to the frame while the spindle is being rotated whereby movement of a tool on the spindle into a work piece for cutting purposes will impose axial thrust forces of reaction on the reference frame through the quill and the nut.

2. The machine tool of claim 1 in which means is provided on the frame to restrain the nut from relative axial movement.

3. The machine tool of claim 2 in which the nut is also restrained from rotational movement and relative motion between the nut and the quill is achieved by rotation of the quill.

4. The machine tool of claim 3 in which the driving actuator means includes means capable of axial extension to cooperate with the quill as it moves axially in response to said driving actuator means.

5. The machine tool of claim 4 in which spline connection is provided between a portion of the driving actuator means fixed to the frame and the portion of the actuator means capable of axial extension.

6. The machine tool of claim 5 in which gear means on the quill engages gear means on the actuator means at least one of which interengaging gear means is provided with sufficient axial length so that said at least one gear means will act as the spline and remain engaged throughout relative axial movement between the quill and the driving actuator means.

7. The machine tool of claim 2 in which the quill is restrained from rotational movement and relative motion between the nut and the quill is achieved by rotation of the nut.

8. The machine tool of claim 7 in which the driving actuator means includes means cooperable with the nut.

9. The machine tool of claim 8 in which relative rotation between the quill and the frame is achieved by making at least a portion of the quill which interengages a portion of the frame of such shape that it will not permit rotation but will permit relative axial motion therebetween.

10. The machine tool of claim 8 in which relative rotation between the quill and the frame is achieved by suitable interposed sliding key and groove means.

11. The machine tool of claim 1 in which the driving actuator means includes rotational drive means.

12. The machine tool of claim 1 in which the driving actuator means includes linear drive means and suitable conversion mechanism for converting linear movement to the rotational motion of the nut and quill combination.

* * * * *